United States Patent
Yamamura et al.

[15] 3,699,149
[45] Oct. 17, 1972

[54] PHENYL ESTERS OF T-AMCHA

[72] Inventors: Yuichi Yamamura, Osaka; Setsuro Fujii, Tokushima-shi; Atsuji Okano; Miyoshi Hirata, both of Tokyo; Yasushi Abiko, Matsudo-shi; Masato Inaoka, Funabashi-shi; Reimei Moroi, Chiba-shi; Mashiro Iwamoto; Shoichi Funabashi, both of Tokyo; Takeo Naito, Ichikawa-shi, all of Japan

[73] Assignee: Daiichi Seiyaku Co., Ltd., Tokyo, Japan

[22] Filed: Sept. 30, 1969

[21] Appl. No.: 862,512

[30] Foreign Application Priority Data

Oct. 14, 1968  Japan ...................43/74220
Dec. 12, 1968  Japan ...................43/90564

[52] U.S. Cl.........260/468 R, 260/295 R, 260/468 C, 260/471 A, 260/472, 260/473 S, 260/473 G, 424/266, 424/305, 424/309

[51] Int. Cl..........................C07c 69/74, C07c 69/78
[58] Field of Search..........................260/468, 471

[56] References Cited

FOREIGN PATENTS OR APPLICATIONS 436,455   3/1968   Japan .......................260/468

*Primary Examiner*—Lorraine A. Weinberger
*Assistant Examiner*—Robert Gerstl
*Attorney*—McGlew & Toren

[57] ABSTRACT

Compounds of the formula

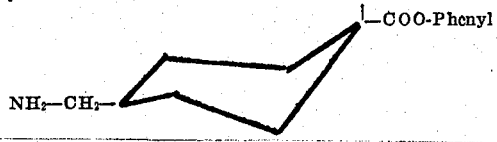

having anti-plasmin activity have been prepared.

10 Claims, No Drawings

PHENYL ESTERS OF T-AMCHA

This invention relates to new esters of certain acids. More particularly, this invention is concerned with the new esters of trans-4-aminomethyl-cyclohexane-1-carboxylic acid (t-AMCHA) or 4-aminomethyl-benzoic acid (PAMBA) and their pharmaceutically acceptable salts and the process for producing same, said esters and salts having distinguished anti-plasmin activity.

Heretofore, trans-4-aminomethyl-cyclohexane-1-carboxylic acid (cf. Chemical and Pharmaceutical Bulletin Vol. 13, 1012-1014 (1965)) and its n-hexyl ester (cf. Japanese Pat. No. 507,331 which corresponds to Japanese Pat. Publn. No. 11059/67 published on June 20, 1967) or benzyl ester (cf. Japanese Pat. No. 526,594 which corresponds to Japanese Pat. Publn. No. 6455/68 published on Mar. 9, 1968) have been known as those having anti-plasmin activity. Among these, t-AMCHA has been used clinically with successful results. However, its n-hexyl and benzyl esters have not been used in practice because of their indistinct effectiveness over t-AMCHA and their unfavorable side effect.

We have now found that the new aromatic esters of t-AMCHA and PAMBA are effective many times in antiplasmin activity over t-AMCHA and its n-hexyl and benzyl esters.

Compounds of the present invention are represented by the general formula:

Q — COO — Aryl wherein Q represents a trans-4-aminomethyl-cyclohexyl or 4-aminomethyl-phenyl group, and "Aryl" represents an aromatic group selected from phenyl, pyridyl, N-oxide-pyridyl and naphthyl groups which may have one or more substituents. More specifically, the present invention comprehends compounds of the following two groups defined by the formula

and

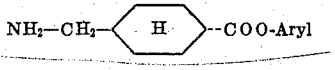

wherein "Aryl" has the same meaning as above.

Compounds of the present invention which are new esters of t-AMCHA and PAMBA are valuable as medicines because of their distinguished anti-plasmin activity. The excellent activity of these esters can be considered owing to the existence of a direct ester linkage of an aromatic ring with the carboxyl group of t-AMCHA or PAMBA, without depending on the type and number of any substituents on said aromatic ring.

Accordingly, the aromatic group which is indicated by the symbol "Aryl" in the above-referred general formulas may have one or more (i.e. up to three) substituents selected from hydroxy, halogen, nitro, subst. or non-subst. amino, carboxyl, formyl, sulfamoyl, prim.-, sec.- or ter.-alkyl having one to six carbon atoms, alkoxy having 1-6 carbon atoms, alkenyl having one to six carbon atoms, phenyl, carboxyalkoxy, carboxyalkenyl, alkoxycarbonyl, carboxyalkylcarbonyl, hydroxyalkyl, and carboxyalkyl the alkyl portion of which may be substituted with amino, hydroxy or halogen.

Thus, it should be understood that the term, "aryl," used in the specification and claims means to cover phenyl, pyridyl, N-oxide-pyridyl and naphthyl which may be optionally substituted with one or more of the above-said substituents.

The new aryl esters of the present invention can be prepared by the reaction of trans-4-aminomethyl-cyclohexane-1-carboxylic acid halogenide or 4-aminomethyl-benzoic acid halogenide with an appropriate aryl alcohol. The amino group of these reactants may optionally be blocked by a protective group which is commonly used in a polypeptide synthesis. Such protective group can be easily removed after the intended reaction.

The typical preparation of compounds of the present invention can be illustrated by the following chemical formulas:

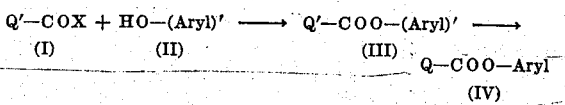

wherein Q' means aforementioned Q itself or that the terminal amino group of which is blocked with such protective group as benzyloxycarbonyl, tert-butyloxycarbonyl and the like, and (Aryl)' means the aforementioned "Aryl" itself or that in which any amino and/or carboxyl group if present are protected with benzyloxycarbonyl and/or benzyl group, respectively.

These protective group in Q and Aryl can be easily removed in above step of (III) to (IV) by treating under reductive conditions or by hydrogen bromide-acetic acid.

The acid halogenide (I) may be directly reacted with the aryl alcohol (II) without using any solvent. Alternatively, the halogenide (I) is dissolved or suspended in a suitable inactive solvent such as ethyl acetate, benzene, tetrahydrofuran, dioxane, carbon tetrachloride, etc. and then the aryl alcohol (II) is added to the resulting solution or suspension to effect reaction. The reaction can proceed even at room temperatures. Stirring and heating are effective to have accelerated reaction. Use of an acid-binding agent, e.g., triethyl amine, pyridine or the like organic base, sometimes is recommendable.

Typical acid halogenides which are suitable as starting materials in this invention include trans-4-aminomethyl-cyclohexane-1-carbonyl chloride, 4-amino-methylbenzoyl chloride, trans-4-N-benzyloxycarbonyl-aminomethylcyclohexane-1-carbonyl chloride, trans-4-N-tert.butyloxycarbonylaminomethyl-cyclohexane-1-carbonyl chloride, 4-N-benzyloxycarbonylaminomethyl-benzoyl chloride, 4-N-tert.butyloxycarbonyl-benzoyl chloride, trans-4-N-p-methoxybenzyloxycarbonylaminomethyl-cyclohexane-1-carbonyl chloride, etc.

The esterification reaction can be carried out by using a non-protected acid halide as the starting material if the aryl alcohol (II) used is liquid and the solubility of the resulting ester is sufficient to keep the reaction medium liquid.

However, when the aryl alcohol used is solid and has poor solubility into the organic solvent used, it is preferable to use a protected acid halide as the starting material for esterification, because the said protected acid halide (e.g. N-benzyloxycarbonyl-AMCHA-chloride) has considerable solubility to various organic solvents, while non-protected acid halide has little solubility.

Among these, those compounds in which the amino group is blocked are novel compounds and can be easily prepared by various methods which are known per se. For example, trans-4-aminomethyl-cyclohexane-1-carboxylic acid is brought into Schotten-Baumann's reaction with benzyloxycarbonyl chloride thereby to obtain trans-4-N-benzyloxycarbonyl-aminomethyl-cyclohexane-1-carboxylic acid (m.p. 115°–117° C.), which is then reacted with thionyl chloride, phosphorous pentachloride, phosphorus trichloride, phosphorus oxychloride or the like chlorinating agent thereby to obtain hygroscopic crystalline trans-4-N-benzyloxycarbonyl-aminomethyl-cyclohexane-1-carbonyl chloride (m.p. 77°–78° C.).

When the acid halogenide having a protective group in its amino group is employed as starting materials, the compound (III) thereby obtained have the corresponding protective groups, which should be removed to obtain desired aryl ester (IV).

Removal of the protective group can be made by any conventionally known method, for example, (a) by treatment of an acetic acid solution of hydrobromic acid, or (b) by catalytic hydrogenation in the presence of palladium-carbon, platinum or the like catalyst in the absence or presence of an organic acid (e.g. p-toluene-sulfonic acid, succinic acid, methane sulfonic acid) or an inorganic acid (e.g. hydrochloric acid, hydrobromic acid, sulfuric acid) in hydrogen stream. When the hydrobromic acid-acetic acid solution is used, the intended reaction is conveniently carried out in the 5–35 percent hydrobromic acid solution at a temperature from room temperature to 100° C.

The procedure (a) is recommendable when only the acyl group for blocking amino group is to be removed with retaining any reduction-susceptible group (e.g. nitro, formyl, vinyl, etc.) on the "aryl" portion derived from the aryl alcohol reactant. If reduction of the reduction-susceptible group also should be effected simultaneously with removal of the protective group, the catalytic hydrogenation (b) using palladium or platinum is recommendable.

As apparent from the above description, various steps can be taken suitably, depending on the type of desired aryl ester. It is appreciated that the most essential aspect of the present invention resides in finding of highly distinguished anti-plasmin activity of certain new aryl esters. However, it also is to be noted that another aspect of the invention resides in the preparation of the said aryl esters by the reaction of trans-4-aminomethyl-cyclohexane-1-carbonyl halogenide or p-aminomethylbenzoyl halogenide with an appropriate aryl alcohol, whereas the introduction or removal of a protective group and the reduction or conversion of any aryl substituted on are mere modifications of the invention which are obvious to those skilled in the art.

The thus obtained aryl esters of trans-AMCHA and Pamba can be isolated in the conventional manner known per se. Usually, it is recommendable to recover these aryl esters in the form of their acid addition salts. Suitable salts are hydrochloride, hydrobromide sulfate, nitrate, phosphate, sulfonate, methanesulfonate, citrate, etc. Hydrochloride and methanesulfonate are particularly preferred because of their utility in medicinal applications.

The aryl esters and their pharmaceutically acceptable acid addition salts comprehended by the invention are useful as medicines because of their high anti-plasmin activity and their good stability in blood. Particularly useful are the substituted phenyl esters of t-AMCHA and PAMBA, the substituted phenyl portion of which is 4'-carboxyphenyl, 4'-carboxymethylphenyl, 4'-(2''-carboxyethyl)-phenyl, 4'-(2''-carboxyvinyl)-phenyl, 4'-(5'''-carboxyethoxy)-phenyl, 4'-(5'''-carboxy-n-pentyl)-phenyl, 4'-(1'''-hydroxy-5''-carboxy-n-pentyl)-phenyl, 4'-(1'''-oxo-5''-carboxy-n-pentyl)-phenyl or 4'-(2''-amino-2''-carboxyethyl)-phenyl. Their pharmaceutically acceptable acid addition salts also are preferred.

Anti-plasmin activity of these new aryl esters is assayed by either of the fibrinolytic or caseinolytic method. In the caseinolytic method, the aryl esters of trans-AMCHA inhibit the plasmin activity several hundred times or several ten times more strongly than trans-AMCHA or benzyl trans-4-aminomethyl-cyclohexanecarboxylate, respectively, does.

Anti-fibrinolytic activities of these aryl esters of trans-AMCHA are several ten times more potent than those of trans-AMCHA or benzyl trans-4-aminomethyl-cyclohexanecarboxylate. The aryl esters of PAMBA, also possess high anti-fibrinolytic and anti-caseinolytic activities which are several times more potent in the former and several ten to hundred times more potent in the latter than those of trans-AMCHA and PAMBA. Anti-plasmin activities of these esters of trans-AMCHA and PAMBA determined by the caseinolytic and fibrinolytic methods are listed in TABLE 1 in which the activities are represented in relative values on molar basis to each of the phenylesters of trans-AMCHA and PAMBA. Comparisons of various activities of these aryl esters with those of the previously known inhibitors, trans-AMCHA, PAMBA and benzyl trans-4-aminomethylcyclohexanecarboxylate, are shown in TABLE 2.

As apparent from the data of TABLE 1 and TABLE 2, the new aryl esters of trans-AMCHA and PAMBA leap into several ten to hundred times more potent in their activities. Although the reason why the aryl esters of the invention can show markedly high pharmacological activities is not fully clear still yet, it is believed that the esters of the invention in which aromatic ring is directly linked to the carboxyl group of the t-AMCHA or PAMBA portion are more effective in anti-plasmin activities than the known benzyl esters in which the aromatic ring is connected through a carbon chain with the carboxyl group.

The aryl esters of trans-AMCHA and PAMBA strongly inhibit the action of plasmin itself as well as the activation of plasminogen to plasmin, whereas it has been reported that trans-AMCHA and PAMBA inhibit only the activation of plasminogen to plasmin (S. Okamoto and U. Okamoto, Keio J. Med. (Tokyo), 11, 105 (1962); A.H.C. Dubber et al., Brit. J. Haematol., 11, 237 (1965); M. Maki and F. K. Beller, Thrombos. Diathes. Haemorrh., 16, 668 (1966); F. Markwaldt et al., Z. Physiol. Chem., 340, 174 (1965); and European J. Biochem., 6, 502 (1968)).

In addition to their superiority in inhibiting the plasmin activity, these aryl esters of trans-AMCHA possess marked inhibitory actions on blood coagulation system including thrombin, on trypsin and on kallikrein. These inhibitory actions are not found or are very little in the previously known antifibrinolytic agents, such as trans-AMCHA, ε-aminocaproic acid, PAMBA and benzyl trans-4-aminomethylcyclohexanecarboxylate.

Compounds of the invention which possess inhibitory actions on the fibrinolytic, blood clotting and kinin-forming systems may be useful for the treatment of various hemorrhage (caused by defibrination) which will be observed in the primary hyperfibrinolysis and even in the secondary hyperfibrinolysis homeostatically following intravascular coagulation state. Anti-trypsin and anti-kallikrein activities of these compounds also support their clinical utility in the treatment of acute pancreatitis.

TABLE 1

Relative activities of esters of trans-AMCHA and PAMBA

| Aryl | Anti-Plasmin Casein | Fibrin | Anti-thrombin | Anti-Plasmin Casein | Fibrin |
|---|---|---|---|---|---|
| Phenyl | 100 | 100 | 100 | 100 | 100 |
| o-toluyl | 44 | 32.4 | 1.67 | 45 | — |
| m-toluyl | 100 | 108 | 55.5 | 50.2 | — |
| p-toluyl | 173 | 165 | 71.5 | 92.1 | — |
| 3,4-dimethyl-phenyl | 91 | 127 | — | 61 | — |
| o-methoxy-phenyl | 27.5 | 53.9 | 5.0 | 63 | — |
| p-methoxyl-phenyl | 120 | 147 | 416 | 85.6 | — |
| o-methoxy-p-methylphenyl | 100 | 96.5 | — | — | — |
| o-methoxy-p-formylphenyl | 233 | 260 | — | — | — |
| o-chloro-phenyl | 115 | 162 | 71.5 | 43.1 | — |
| m-chloro-phenyl | 136 | 85.3 | 250 | 34.8 | — |
| p-chloro-phenyl | 250 | 157 | 250 | 178 | — |
| o,p-dichloro-phenyl | 140 | 200 | — | 159 | — |
| o-bromo-phenyl | 97 | 172 | 55.5 | 141 | — |
| p-tert-butyl-phenyl | 149 | 171 | — | 163 | — |
| p-hydroxy-phenyl | 74.3 | 96.5 | 94.4 | — | — |
| p-hydroxymeth-yl-phenyl | 172 | 169 | 250 | 85.6 | — |
| p-amino-phenyl | 69 | 96.5 | 156 | 94 | — |
| p-nitro-phenyl | 187 | 242 | 555 | 1900 | — |
| o-nitro-p-methoxy-carbonyl-phenyl | 49 | 323 | — | — | — |
| p-sulfamoyl-phenyl | 428 | 424 | — | — | — |
| p-benzyloxyca-rbonyl-phenyl | — | — | — | 970 | 1490 |
| p-carboxy-phenyl | 116 | 35.2 | 14.3 | 90.5 | 77 |
| p-carboxymeth-yl-phenyl | 100 | 80 | 89.3 | 66.7 | 53.8 |
| p-(2-carboxy-ethyl)-phenyl | 126 | 135 | 56.8 | 70 | 77 |
| m-(2-carboxy-ethyl)-phenyl | 44.2 | 43.2 | — | 27.8 | 21.6 |
| p-(2-carboxy-vinyl)-phenyl | 198 | 226 | 8.93 | 162 | 215 |
| p-(2-carboxy-2-amino-ethyl)-phenyl | 86.0 | 80.2 | 23.8 | 33.1 | 28.9 |
| p-(2-carboxy-ethoxy)-phenyl | 118 | 111 | — | 58.7 | 61 |
| p-(5-carboxy-pentyl)-phenyl | 200 | 254 | — | 171 | 223 |
| p-(1-hydroxy-5-carboxy-pentyl)-phenyl | 211 | 194 | — | — | — |
| p-(1oxo-5-carboxy-pentyl)-phenyl | 290 | 212 | — | — | — |
| 3-pyridyl | 160 | 200 | — | — | — |
| pyridine N-oxide-3-yl | 33 | 148 | — | — | — |
| α-naphthyl | 68 | — | — | 8.8 | — |
| β-naphthyl | 87 | — | — | — | — |
| 3-carboxy-2-naphthyl | 9 | 14.8 | — | — | — |

TABLE 2.—CONCENTRATION OF DRUGS CAUSING 50% INHIBITION [1]

| | Anti-plasmin | | Anti-thrombin [4] | Anti-Trypsin [5] | Anti-kallikrein [6] |
|---|---|---|---|---|---|
| | Casei-nolysis [2] | Fibri-nolysis [3] | | | |
| trans-AMCHA | 2,400 (1) | 49 (1) | Inactive | Inactive | Inactive. |
| PAMBA | 4,000 (0.6) | 110 (0.54) | do | Very weak. | Do. |
| Benzylester of trans-AMCHA. | 56 (43) | 37 (1.6) | 500 (1) | 240 (1) | Do. |
| Phenylester of trans-AMCHA. | 2 (1,200) | 1.8 (32.8) | 5 (100) | 50 (4.8) | Less than 1,000. |
| Phenylester of PAMBA. | 12 (200) | 9 (6.6) | | | |

(Figures in the parenthesis indicate relative activities.)

LEGEND FOR TABLE 2

1. The concentrations are represented as umoles/ml.
2. Anticaseinolytic activity of the compounds was determined by the method of M. Shimizu, et al. [Chem. Pharm. Bull. (Tokyo), 16, 357 (1968)]. 0.5 ml of euglobulin solution prepared from human blood was preincubated with 1 ml of 2% casein solution in phosphate buffer-saline (pH 7.4) and 0.4 ml of the phosphate buffer-saline containing various amounts of an inhibitor to be tested at 37° C. for 3 minutes. Then, 0.1 ml of streptokinase solution (200 units) was added and the mixture was incubated at 37° C. for 20 minutes. After incubation, 2 ml of 17 percent perchloric acid was added, allowed to stand at room temperature for about 1 hour, and centrifuged. The extinction of the clear supernatant was measured at 280 mμ against an enzyme blank to which the streptokinase solution was added after the addition of perchloric acid. The inhibition rates were calculated by comparison with the control run which contained no inhibitor.
3. Antifibrinolytic activity was determined according to the method of S. Okamoto and U. Okamoto [Keio J. Med. (Tokyo), 11, 105 (1962)]. 0.1 ml of the human euglobulin solution was mixed with 0.5 ml of the phosphate buffer-saline containing various amounts of an inhibitor to be tested, 0.1 ml of thrombin solution (5 units) and 0.1 ml of streptokinase solution (100 units), and finally 0.2 ml of 0.5 percent bovine fibrinogen solution in phosphate buffer-saline was added to the above mixture. The lysis time of the fibrin clot formed was measured at 25° C. after the addition of fibrinogen. Inhibitory actions of the compounds are represented as the concentrations of the compounds for doubling the clot lysis time of the control run which contained no inhibitor.

4. Anti-thrombin activity of the compounds was determined by the fibrin-clot forming reaction due to thrombin. Inhibitory actions of the compounds are represented as the concentrations of the compounds for doubling the clotting time of the control run which contained no inhibitor.

5. Anti-trypsin activity of the compounds were determined by the caseinolytic reaction due to trypsin.

6. Anti-kallikrein activity of the compounds was determined by the kinin-forming reaction due to human plasma kallikrein activated with acetone followed by kinin bioassay using isolated guinea pig uterus, or by the esterolytic reaction of α N-tosyl-L-arginine methylester due to plasma kallikrein.

Toxicities of these new esters generally are low both in oral and parenteral administrations. For example, acute toxicities of some new esters are listed in the following Table.

Compounds tested

| Aryl | Toxicities. L $D_{50}$(mg/kg) |
|---|---|
| $C_6H_5-$ | 119.7 (I.V. mouse) |
| p-$O_2$N-$C_6H_4-$ | 200 (I.V. mouse) |
| p-HOOC-$CH_2$-$C_6H_4-$ | 1097 (I.P. mouse) |
| p-HOOC-CH=CH-$C_6H_4-$ | 1062 (I.P. mouse) |
| p-HOOC-$CH_2CH_2$-$C_6H_4-$ | 850 (I.P. rat), 480 (I.V. mouse), >6000 (P.O. mouse) |
| p-HOOC-CH($NH_2$)-$CH_2$-$C_6H_4-$ | 409 (I.V. mouse), 9080 (P.O. mouse) |

I.V.: Intra-venous administration.
I.P.: Intra-peritoneal administration.
P.O.: Per os Now the following examples will be given to show the present invention in detail.

EXAMPLE 1

2.5 g (0.011 mole) of 4-benzyloxycarbonylphenol and 1.2 g of triethylamine were dissolved in 20 ml of dried tetrahydrofuran. To this solution was added 3.1 g (0.010 mole) of trans-4-N-benzyloxycarbonylaminomethyl-cyclohexane-1-carboxylic acid chloride dissolved in 10 ml of dried benzene. The mixture was stirred for about one hour at room temperature, heated to 60°~80° C. for 30 minutes and then evaporated to dryness in vacuo. The residue was dissolved in ethyl acetate, washed several times with water, dried and evaporated to obtain colorless syrup. After cooling, the syrup changed to solid, which was recrystallized from ethanol to obtain 4.9 g (88 percent) of 4'-benzyloxycarbonylphenyl trans-4-N-benzyloxycarbonylaminomethylcyclohexane-1-carboxylate with a melting point of 98°~100° C.

2.5 g (0.005 mole) of this ester was dissolved in 10 ml of tetrahydrofuran and 20 ml of methanol. To this solution were added 2 ml of 25 percent methanolic hydrochloric acid and 0.5 g of palladium on carbon. The mixture was treated with hydrogen stream under an atmospheric pressure at room temperature. After the absorption of the theoretical amount of hydrogen, the catalyst was filtered off and the filtrate was evaporated in vacuo at low temperature to obtain white crystals. Recrystallization of the crystals from ethanol yielded 1.0 g (65 percent) of 4'-carboxyphenyl trans-4-aminomethyl-cyclohexane-1-carboxylate hydrochloride in the form of prisms with a melting point of 255° C. (decomposed).

Elementary analysis for $C_{15}H_{20}O_4NCl$: (M.W. 313.78)

Calcd. C 57.41, H 6.42, N 4.46, Cl 11.30
Found C 57.28, H 6.39, N 4.61, Cl 10.79

EXAMPLES 2–10

By repeating the substantially same procedures as in Example 1, various new aryl esters were prepared. The results are summarized in the following Table 3.

Table 3.—$NH_2CH_2-$$----COO-Aryl$

| Example number | Aryl | Salt | M.p. (° C.) | Yield (percent) | Elementary analysis (found) | | | |
|---|---|---|---|---|---|---|---|---|
| | | | | | C | H | N | Cl |
| 2 | 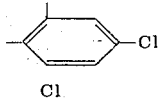 | HCl | 201 (dec.) | 88 | 49.96 | 5.13 | 4.35 | 31.79 |
| 3 | 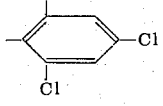 | HCl | 210–213 (dec.) | 78.3 | 45.37 | 4.42 | 4.06 | 38.10 |
| 4 | 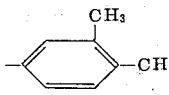 | HCl | 241 (dec.) | 78 | 64.73 | 8.14 | 4.81 | ------ |

Table 3.—NH₂CH₂—⟨H⟩—COO-Aryl—Continued

| Example number | Aryl | Salt | M.p. (°C.) | Yield (percent) | C | H | N | Cl |
|---|---|---|---|---|---|---|---|---|
| 5 | 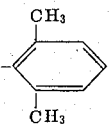 (2,6-dimethylphenyl) | HCl | 221–223 (dec.) | 68 | 64.65 | 8.04 | 5.07 | |
| 6 | 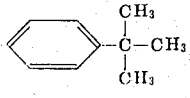 (4-tert-butylphenyl) | HCl | 256 (dec.) | 86 | 66.48 | 8.63 | 4.86 | |
| 7 |  (4-hydroxyphenyl) | HCl | 212–214 (dec.) | 42 | 59.17 | 7.59 | 4.66 | |
| 8 | 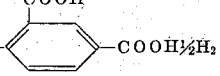 (3,4-dicarboxyphenyl) | HCl | 181–183 (dec.) | 40 | 52.69 | 5.81 | 3.98 | |
| 9 | 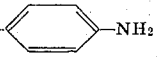 (4-aminophenyl) | 2HCl | 262 (dec.) | 75 | 52.50 | 6.88 | 8.97 | |
| 10 | 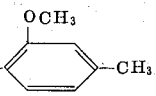 (3-methoxy-4-methylphenyl) | HCl | 188–191 (dec.) | 46 | 60.44 | 7.57 | 4.79 | |

EXAMPLE 11

2'-Nitro-4'-methoxycarbonylphenyl trans-4-N-benzyloxycarbonylaminomethylcyclohexane-1-carboxylate was prepared by reacting methyl 3-nitro-4-hydroxybenzoate with trans-4-N-benzyloxycarbonylaminomethylcyclohexane-1-carboxylic acid chloride according to the process of Example 1.

2.4 g of this ester was dissolved in 10 ml of 20 percent hydrobromic acid solution in acetic acid. The mixture was warmed to about 50° C. for 10 minutes, cooled and added with diethyl ether to effect precipitation. The crystals obtained were washed well with diethyl ether and recrystallized from ethanol-diethyl ether to obtain 1.2 g (56 percent) of 2'-nitro-4'-methoxycarbonylphenyl trans-4-aminomethylcyclohexane-1-carboxylate hydrobromide in the form of prisms with a melting point of 183°~186° C.

Elementary analysis for C₁₆H₂₁O₆N₂Br: (M.W. 417.26)
Calcd. C 46.05, H 5.07, N 6.71
Found C 46.24, H 4.94, N 6.57

EXAMPLES 12–16

By repeating the substantially same procedures as in Example 11, various new aryl esters were prepared. The results are summarized in the following Table 4.

EXAMPLE 17

2.0 g of benzyl 4-hydroxycinnamate and 1.0 g of triethylamine were dissolved in 10 ml of dried dioxane. To this solution was added 2.5 g of trans-4-N-benzylox- Table 4.—NH₂CH₂—⟨H⟩—COO-Aryl

| Example number | Aryl | Salt | M.p. (°C.) | Yield (percent) | C | H | N | Br |
|---|---|---|---|---|---|---|---|---|
| 12 | 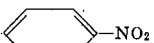 (4-nitrophenyl) | HBr | 190–192 (dec.) | 85 | 46.82 | 5.57 | 7.67 | |
| 13 | 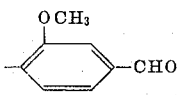 (3-methoxy-4-formylphenyl) | HBr | 242–245 (dec.) | 75 | 52.02 | 6.28 | 3.66 | |
| 14 | 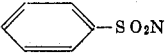 (4-sulfamoylphenyl) | HBr | 261 (dec.) | 86 | 42.53 | 5.43 | 7.23 | 20.67 |
| 15 |  (pyridyl) | 2HBr | 193–195 (dec.) | 52.2 | 39.27 | 5.01 | 7.44 | 39.93 |
| 16 |  (N-oxide pyridyl) | HBr | 278 (dec.) | 58 | 46.93 | 5.79 | 8.54 | | y-carbonylaminomethylcyclohexane-1-carboxylic acid chloride in 10 ml of dried benzene. The mixture was stirred for about one hour at room temperature and then heated to 60°~80° C. for 30 minutes. After cooling, crystallized triethylamine hydrochloride was removed by filtration, and the filtrate was evaporated to obtain colorless syrup which was changed to solid. The crude product was recrystallized from ethyl acetate and petroleum ether to obtain 3.2 g (75 percent) of 4'-(2''-benzyloxycarbonylvinyl)phenyl trans-4-N-benzyloxycarbonylaminomethylcyclohexane-1-carboxylate in the form of white crystalline powder with a melting point of 121°~123° C.

Elementary analysis for $C_{32}H_{33}O_6N$ (M.W. 527.62):
Calcd. C 72.82, H 6.30
Found C 72.23, H 6.15

To this ester was added 20 g of 33 percent hydrobromic acid solution in acetic acid. The mixture was stirred for about 20 minutes at room temperature. Then the mixture was cooled enough and then added with 50 ml of dried diethyl ether. The crude product precipitated was collected by filtration, washed with diethyl ether and recrystallized from ethanol-diethyl ether to obtain 1.4 g (62%) of 4'-(2''-carboxyvinyl)phenyl trans-4-aminomethyl-cyclohexane-1-carboxylate hydrobromide in the form of white crystalline powder with a melting point of 252°~254°C. (dec.).

Elementary analysis for $C_{17}H_{22}O_4NBr$ (M.W. 384.27)
Calcd. C 53.13, H 5.77, N 3.64, Br 20.80
Found C 53.07, H 6.29, N 3.71, Br 20.84

EXAMPLES 18–19

By repeating the substantially same procedures as in Example 17, various new aryl esters were prepared. The results are summarized in the following Table 5.

EXAMPLE 20

4'-N'-(2''-benzyloxycarbonylamino-2''-benzyloxycarbonylethyl)phenyl trans-4-N-benzyloxycarbonylaminomethyl-cyclohexane-1-carboxylate with a melting point of 137°~139° C. was obtained by reacting benzyl N-benzyloxycarbonyltyrosinate with trans-4-N-benzyloxycarbonylaminomethyl-cyclohexane-1-carboxylic acid chloride in the same manner as in Example 17.

4.5 g of the obtained ester was dissolved in 30 ml of glacial acetic acid, and to the resulting solution 0.5 g of 10 percent palladium on carbon was added. The mixture was treated with hydrogen stream under an atmospheric pressure at room temperature. After the absorption of the theoretical amount of hydrogen, the catalyst was filtered off. By adding 5 percent hydrochloric acid in acetic acid, diethyl ether and petroleum ether to the filtrate, crude product was precipitated and then collected by filtration. The crude product was recrystallized from ethanol-ether to obtain 2.2 g (85.4 percent) of 4'-(2''-carboxy-2-amino-ethyl)-phenyl trans-4-aminomethyl-cyclohexane-1-carboxylate dihydrochloride in the form of powder with a melting point of 251° C. (dec.).

Elementary analysis for $C_{17}H_{24}O_4N_2 \cdot 2HCl$ (M.W. 393.31):

Calcd. C 51.91, H 6.66, N 7.12, Cl 18.03
Found C 51.90, H 6.56, N 7.22, Cl 18.32

EXAMPLES 21–30

By repeating the substantially same procedures as in Example 20, various new aryl esters were prepared. The results are summarized in the following Table 6.

TABLE 5

| Example number | Aryl | Salt | M.p. (° C.) | Yield (percent) | Elementary analysis (found) | | | |
|---|---|---|---|---|---|---|---|---|
| | | | | | C | H | N | Br |
| 18 | –⟨phenyl⟩–CH₂COOH | HBr | 210 (dec.) | 60 | 51.98 | 5.94 | 4.16 | 20.69 |
| 19 | –⟨phenyl⟩–(CH₂)₅COOH | HBr | 195 (dec.) | 65 | 55.60 | 6.75 | 3.42 | |

Table 6.—NH₂CH₂–⟨H⟩----COO-Aryl

| Example number | Aryl | Salt | M.p. (° C.) | Yield (percent) | Elementary analysis (found) | | | | | |
|---|---|---|---|---|---|---|---|---|---|---|
| | | | | | C | H | N | Cl | Br | S |
| 21 | –⟨phenyl⟩–CH₂CH(NH₂)COOH | 2HBr | 205–207 (dec.) | 92.4 | 41.13 | 5.58 | 5.75 | | 32.76 | |
| 22 | –⟨phenyl⟩–CH₂CH(NH₂)COOH·H₂O | 2CH₃SO₃H | 204–206 (dec.) | | 43.33 | 6.54 | 5.55 | | | 11.87 |
| 23 | –⟨phenyl⟩–CH₂CH₂COOH | HCl | 236–238 (dec.) | 88 | 59.89 | 6.91 | 4.08 | | | |
| 24 | –⟨phenyl⟩–CH₂CH₂COOH | CH₃SO₃H | 213–215 | 80 | 53.76 | 6.64 | 5.38 | | | 8.09 |

Table 6.—NH₂CH₂—⟨H⟩—COO-Aryl—Continued

| Example number | Aryl | Salt | M.p. (° C.) | Yield (percent) | C | H | N | Cl | Br | S |
|---|---|---|---|---|---|---|---|---|---|---|
| 25 | -C₆H₄-CH₂CH₂COOH | HCl | 197–199 | 81.3 | 59.77 | 6.98 | 4.17 | 10.76 | | |
| 26 | -C₆H₄-OCH₂CH₂COOH | HCl | 213 (dec.) | 84.3 | 57.03 | 6.70 | 4.26 | 10.55 | | |
| 27 | -C₆H₄-CO(CH₂)₄COOH | HCl | 173–175 | 62 | 60.14 | 7.17 | 3.64 | 8.95 | | |
| 28 | -C₆H₄-NHCH₂COOH | HCl | 213–214 (dec.) | 76 | 56.08 | 6.70 | 8.32 | | | |
| 29 | naphthyl-COOH | HCl | 208–210 (dec.) | 20 | 62.28 | 6.06 | 4.00 | 10.00 | | |
| 30 | pyridyl-COOH | HCl | 216–218 (dec.) | 40 | 52.49 | 6.03 | 8.45 | 10.84 | | |

EXAMPLE 31

3.2 g of 4'-(2''-benzyloxycarbonylvinyl)phenyl trans-4-N-benzyloxycarbonylaminomethylcyclohexane-1-carboxylate (prepared in Example 17) was treated in the same manner as in Example 20 to obtain 1.8 g (87 percent) of 4'-(2''-carboxyethyl)phenyl trans-4-aminomethylcyclohexane-1-carboxylate hydrochloride in the form of white crystalline powder with a melting point of 236°~238° C. (dec.).

EXAMPLE 32

12.4 g (0.04 mole) of trans-4-aminomethyl-cyclohexane-1-carboxylic acid chloride was dissolved in 50 ml of benzene. The resulting solution was added dropwise to a solution of 5.4 g (0.044 mole) of 4-hydroxybenzaldehyde and 6.4 g (0.08 mole) of pyridine in 20 ml of dioxane at room temperature, and allowed to stand overnight. After the removal of pyridine hydrochloride by filtration, the filtrate was evaporated to dryness in vacuo. To the residue water and benzene were added, and then the benzene layer was washed enough with water, dried and evaporated to dryness in vacuo to obtain colorless crystals. Recrystallization of the crystals from ethanolpetroleum-ether yielded 10 g (62.5 percent) of 4'-formylphenyl trans-4-N-benzyloxycarbonylaminomethyl-cyclohexane-1-carboxylate in the form of powder with a melting point of 105°~107° C.

Elementary analysis for $C_{23}H_{25}O_5N$ (M.W. 395.44):
Calcd. C 69.85, H 6.37, N 3.54
Found C 70.01, H 6.29, N 3.65

10 g of this ester was dissolved in 30 ml of tetrahydrofuran and then 60 ml of methanol was added. To the solution 0.5 g of sodium borohydride was added with cooling with ice water and the mixture was stirred for one hour. When the mixture was poured into cold water, white crystals were precipitated. The crude crystals were washed with water, dried and recrystallized from ethanol and further from ethanol-petroleum ether to obtain 6.3 g (64 percent) of 4'-hydroxymethylphenyl trans-4-N-benzyloxycarbonylaminomethylcyclohexane-1-carboxylate in the form of needles with a melting point of 112°~113° C.

Elementary analysis for $C_{23}H_{27}O_5N$ (M.W. 397.45):
Calcd. C 69.50, H 6.85, N 3.52
Found C 69.37, H 6.90, N 3.62

6.3 g (0.016 mole) of the ester was dissolved in 150 ml of methanol. To the resulting solution were added 2 ml of 30 percent methanolic hydrochloric acid and 3 g of palladium on carbon. The mixture was treated with hydrogen stream under an atmospheric pressure at room temperature. After the absorption of the theoretical amount of hydrogen the catalyst was filtered off and the filtrate was evaporated to dryness in vacuo. The white residue was recrystallized from methanol-diethyl ether to obtain 2.5 g (52 percent) of 4'-hydroxymethylphenyl trans-4-aminomethyl-cyclohexane-1carboxylate hydrochloride in the form of white needles with a melting point of 241°~242° C. (dec.).

Elementary analysis for $C_{15}H_{22}O_3NCl$ (M.W. 299.81):
Calcd. C 60.09, H 7.39, N 4.67, Cl 11.82
Found C 60.21, H 7.48, N 4.70, Cl 11.78

EXAMPLE 33

4'-(1''-oxo-5''-benzyloxycarbonyl-n-pentyl)phenyl trans-4-N-benzyloxycarbonylaminomethylcyclohexane-1-carboxylate with a melting point of 72°~75° C. was prepared by reacting 4-(1'-oxo-5'-benzyloxycarbonyl-n-pentyl)-phenol with trans-4-N-benzyloxycarbonylaminomethylcyclohexane-1-carboxylic acid chloride. Yield 86.5 percent.

Elementary analysis for $C_{35}H_{39}O_7N$ (M.W. 585.67):
Calcd. C 71.77, H 6.71, N 2.39
Found C 71.19, H 6.53, N 2.76

The ester was treated with sodium borohydride in the same manner as in Example 32 and the resulting product was recrystallized from isopropyl ether to obtain 4'-(1'''-hydroxy-5''-benzyloxycarbonyl-n-pentyl)phenyl trans-4-N-benzyloxycarbonylaminomethylcyclohexane-1-carboxylate with a melting point of 62°~65 C. Yield 79 percent.

Elementary analysis for $C_{35}H_{41}NO_7$ (M.W. 587.69):
Calcd. C 71.53, H 7.03, N 2.38
Found C 71.49, H 7.03, N 2.81

The above-resulted compound was treated in the same manner as in Example 20 to obtain 4'-(1''-hydroxy-5''-carboxy-n-pentyl)phenyl trans-4-aminomethylcyclohexane-1-carboxylate hydrochloride in the form of prisms with a melting point of 150°~154° C. Yield 53 percent.

Elementary analysis for $C_{20}H_{30}O_5NCl$ (M.W. 399.91):
Calcd. C 60.06, H 7.56, N 3.50, Cl 8.87
Found C 60.15, H 7.56, N 3.76, Cl 9.37

EXAMPLE 34

4'-(1'''-hydroxy-5''-benzyloxycarbonyl-n-pentyl)phenyl trans-4-N-benzyloxycarbonylaminomethylcyclohexane-1-carboxylate obtained in Example 33 was treated with hydrobromic acid-acetic acid in the same manner as in Example 11 to obtain 4'-(1''-bromo-5''-carboxy-n-pentyl)phenyl trans-4-aminomethylcyclohexane-1-carboxylate hydrobromide in the form of powder with a melting point of 139° C. (dec.). Yield 39.4 percent.

Elementary analysis for $C_{20}H_{29}O_4NBr_2$ (M.W. 507.27):
Calcd. C 47.35, H 5.76, N 2.76, Br 31.51
Found C 47.31, H 5.90, N 3.02, Br 30.92

EXAMPLE 35

Trans-4-N-tert-butyloxycarbonylaminomethylcyclohexane-1-carboxylic acid chloride in the form of syrup prepared by reacting 2.3 g of trans-4-N-tertbutyloxycarbonylaminomethylcyclohexane-1-carboxylic acid with 2.4 g of thionyl chloride in the presence of triethylamine was dissolved in 40 ml of dried benzene. To the resulting mixture were added 1.5 g of triethylamine and 2.6 g (0.01 mole) of benzyl 4-hydroxycinnamate dissolved in 20 ml of dried benzene. The solution was heated to 70°~80° C. for 30 minutes on a water bath. After cooling the benzene layer was washed enough with water, dried and evaporated to dryness. The residue was recrystallized from ethyl acetate-petroleum ether to obtain 3.1 g (63.0%) of 4'-(2''-benzyloxycarbonylvinyl) phenyl trans-4-N-tert-butyloxycarbonylaminomethylcyclohexane-1-carboxylate in the form of small needles with a melting point of 141°~142° C.

Elementary analysis for $CC_{29}H_{35}O_6N$ (M.W. 493.58):
Calcd. C 70.56, H 7.15, N 2.84
Found C 70.22, H 6.59, N 2.99

The thus obtained compound was treated in the same manner as in Example 17 to obtain 4'-(2''-carboxyvinyl)-phenyl trans-4-aminomethylcyclohexane-1-carboxylate hydrobromide in the form of white crystalline powder with a melting point of 252°~254° C. (dec.). Yield 68 percent.

EXAMPLE 36

To 4.2 g of trans-4-aminomethylcyclohexane-1-carboxylic acid chloride hydrochloride was added 2.2 g of phenol dissolved in 50 ml of dried tetrahydrofuran. The mixture was refluxed for about 30 minutes and evaporated to obtain white crystalline residue. Recrystallization of the residue from ethanol-diethyl ether yielded 4.0 g (75 percent) of phenyl trans-4-aminomethyl-cyclohexane-1-carboxylate hydrochloride in the form of needles with a melting point of 213°~215° C. (dec.).

Elementary analysis for $C_{14}H_{20}O_2NCl$ (M.W. 269.77):
Calcd. C 62.33, H 7.47, N 5.19
Found C 62.37, H 7.56, N 5.37

EXAMPLES 37–40

By repeating the substantially same procedures as in Example 36, various new aryl esters were prepared. The results are summarized in the following Table 7.

TABLE 7.—$NH_2CH_2$—⟨H⟩—COO-Aryl

| Example Number | Aryl | Salt | M.p. (° C.) | Yield (percent) | Elementary analysis (found) | | | |
|---|---|---|---|---|---|---|---|---|
| | | | | | C | H | N | Cl |
| 37 | –⟨⟩–Cl | HCl | 198–202 (dec.) | 80 | 56.21 | 6.42 | | 23.14 |
| 38 | (naphthyl) ½H₂O | HCl | 200–203 (dec.) | 75 | 65.66 | 6.96 | 4.51 | |
| 39 | (naphthyl) | HCl | 239 (dec.) | 62 | 66.67 | 6.92 | 4.42 | |
| 40 | –⟨⟩–⟨⟩ | HCl | 243 (dec.) | 65 | 69.15 | 7.03 | 4.53 | |

EXAMPLE 41

To 3.0 g of trans-4-aminomethylcyclohexane-1-carboxylic acid chloride hydrochloride, 10 ml of o-cresol was added to occur exothermic reaction. The resulting mixture was allowed to stand for about 30 minutes at room temperature and the crystals were precipitated with a large amount of diethyl ether. The crystals were washed enough with diethyl ether to remove cresol, and recrystallized from methanol-diethyl ether to obtain 3.2 g (81 percent) of 2-methylphenyl trans-4-aminomethylcyclohexane-1-carboxylate hydrochloride in the form of white leaflets with a melting point of 181°~183° C.

Elementary analysis for $C_{15}H_{22}O_{22}NCl$ (M.W. 283.79):
Calcd. C 63.48, H 7.81, N 4.94
Found C 63.36, H 7.71, N 5.23

EXAMPLES 42–49

By repeating the substantially same procedures as in Example 41, various new aryl esters were prepared. The results are summarized in the following Table 8.

in the form of white prisms with a melting point of 171°~192° c.

Elementary analysis for $C_{24}H_{30}O_4N$ (M.W. 439.95):
Calcd. C 66.73, H 7.00, N 3.24, Cl 8.21
Found C 66.97, H 6.85, N 3.45, Cl 8.39

The prisms obtained were dissolved in the mixture of 20 ml of glacial acetic acid and 20 ml of dry dimethylformamide. Then the resulting mixture was treated with hydrogen stream under an atmospheric pressure at room temperature in the presence of 0.5 g of 10 percent palladium on carbon. After absorption of the theoretical amount of hydrogen, the catalyst was filtered off, and to the filtrate a large amount of diethyl ether was added. The crude product precipitated was collected by filtration and recrystallized from ethanol-diethyl ether to obtain 1.34 g (79%) of 4'-(2''-carboxyethyl)phenyl trans-4-aminomethylcyclohexane-1-carboxylate hydrochloride in the form of white crystals with a melting point of 236°~238° C.

TABLE 8.—NH$_2$CH$_2$—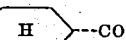—COO-Aryl

| Example number | Aryl | Salt | M.p. (° C.) | Yield (percent) | Elementary analysis (found) | | | |
|---|---|---|---|---|---|---|---|---|
| | | | | | C | H | N | Cl |
| 42 | OCH$_3$ (ortho-phenyl) | HCl | 212–213 | 77 | 60.43 | 7.36 | 4.78 | |
| 43 | phenyl-OCH$_3$ (para) | HCl | 215–217 (dec.) | 83 | 60.48 | 7.39 | 11.51 | |
| 44 | CH$_3$ (ortho-phenyl) | HCl | 183–185 | 79 | 63.44 | 7.75 | 5.07 | |
| 45 | phenyl-CH$_3$ (para) | HCl | 240–242 (dec.) | 88 | 63.45 | 7.53 | 5.35 | |
| 46 | Cl (ortho-phenyl) | HCl | 175–177 | 85 | 55.40 | 6.11 | | 23.32 |
| 47 | Cl (meta-phenyl) | HCl | 191–194 (dec.) | 80 | 55.47 | 6.34 | | 23.52 |
| 48 | Br (ortho-phenyl) | HCl | 169–171 | 83 | 47.81 | 5.38 | 4.36 | |
| 49 | CH$_3$—phenyl—CH$_3$ (2,4-dimethyl) | HCl | 215 (dec.) | 85 | 64.64 | 8.08 | 5.02 | |

EXAMPLE 50

To 2.1 g of trans-4-aminomethylcyclohexane-1-carbonyl chloride was added 15 g of benzyl 4-hydroxyphenylpropionate with stirring. The resulting mixture was heated to 60°~70° C. with stirring for about 30 min.. Vigorous reaction occured with evolution of gaseous hydrochloride to give a homogeneous syrup. After cooling, white crystalline powder was precipitated by adding 100 ml of dry diethylether and mixing enough. The crystals were collected by filtration and washed enough with dry diethyl ether. Then the crystals were dissolved in methanol and precipitated by adding diethyl ether to obtain 3.74 g (85 percent) of 4'-(2''-benzyloxycarbonylethyl)phenyl trans-4-aminomethylcyclohexane-1-carboxylate hydrochloride

EXAMPLE 51

16.6 g (0.1 mole) of 4-hydroxyphenylpropionic acid and 15.8 g of pyridine (0.2 mole) were dissolved in 100 ml of dry dioxane. To the mixture, trans-4-N-benzyloxy-y-carbonylaminomethylcyclohexane-1-carbonyl chloride dissolved in 150 ml of dry benzene was added, and the resulting mixture was stirred for 30 hours at room temperature. Then the precipitated crystals were filtered off and the filtrate was allowed to stand overnight and the crystals separated were filtered off again. To the filtrate 100 ml of diethyl ether was added and allowed to stand overnight. The white crystals were collected by filtration and recrystallized from ethyl acetate-petroleum ether to obtain 6 g (13.6 percent) of 4'-(2''-carboxyethyl)phenyl trans-4-N-benzyloxycarbonylaminomethylcyclohexane1 1-carboxylate with a melting point of 105°~108° C.

Elementary analysis for $C_{25}H_{29}O_6N$ (M.W. 439.49):
Calcd. C 68.32, H 6.65, N 3.19
Found C 68.60, H 6.42, N 2.94

2.1 g (0.005 mole) of the crystals was dissolved in 500 ml of glacial acetic acid, and to the resulting mixture, 1.0 g of 10 percent palladium on carbon was added. Then the solution was treated with hydrogen stream under an atmospheric pressure at room temperature. After absorption of the theoretical amount of hydrogen, the catalyst was filtered off and to the filtrate a small excess amount of hydrochloric acid-acetic acid was added and further dry ether was added. The white crystals were collected by filtration and recrystallized from ethanol-diethyl ether to obtain 1.28 g (82 percent) of 4'-(2''-carboxyethyl)phenyl trans-4-aminomethylcyclohexane-1-carboxylate hydrochloride in the form of white crystals with a melting point of 236°~238° C. (dec.).

EXAMPLE 52

19 g (0.1 mole) of sodium 4-hydroxyphenylpropionate was suspended in 120 ml of dry dioxane. To the mixture was added 31 g (0.1 mole) of trans-4-N-benzyloxycarbonylamino-methylcyclohexane-1-carboxylate dissolved in 150 ml of dry benzene and the resulting mixture was stirred for 12 hours at room temperature. Then the precipitation was filtered off and the filtrate was evaporated. To the resulting solution 100 ml of diethyl ether was added and the mixture was allowed to stand overnight. The crystals were collected by filtration and recrystallized from ethyl acetate-petroleum ether to obtain 4 g )9.1 percent) of 4'-(2''-carboxyethyl)phenyl trans-4-N-benzyloxycarbonylamino-methylcyclohexane-1-carboxylate in the form of white crystals with a melting point of 102°~105° C.

The ester was treated in the same manner as in Example 51 to obtain 4'-(2''-carboxyethyl)phenyl trans-4-aminomethylcyclohexane-1-carboxylate hydrochloride.

EXAMPLE 53

1.5 g (0.011 mole) of 4-nitrophenol and 1.2 g (0.012 mole) of triethylamine were dissolved in 20 ml of dried tetrahydrofuran. To the resulting mixture was added 3.0 g (0.01 mole) of 4-N-benzyloxycarbonylamino-methylbenzoic acid chloride dissolved in 20 ml of dried benzene. The mixture was heated to 60°~80° C. for one hour with stirring and evaporated in vacuo. The residue was dissolved in ethyl acetate and the mixture was washed several times with water and evaporated to obtain colorless syrup. After cooling the syrup changed to solid, which was recrystallized from ethanol to obtain 3.1 g (76 percent) of 4'-nitrophenyl 4-N-benzyloxycarbonyl aminomethylbenzoate in the form of yellow needles with a melting point of 143°~145° C.

Elementary analysis for $C_{22}H_{18}O_6N_2$ (M.W. 406.38):
Calcd. C 65.02, H 4.46, N 6.89
Found C 65.27, H 4.52, N 6.73

2.0 g (0.005 mole) of this ester was dissolved in 10 ml of 20 percent hydrobromic acid-acetic acid. The solution was warmed to about 40° C. for 10 minutes, and cooled. Crude crystals were precipitated with 50 ml of dried diethyl ether, washed enough with diethyl ether and recrystallized from ethanol to obtain 1.4 g (79 percent) of 4'-nitrophenyl 4-aminomethylbenzoate hydrobromide in the form of needles with a melting point of 228° C. (dec.).

Elementary analysis for $C_{14}H_{13}O_4N_2Br$ (M.W. 353.18):
Calcd. C 47.61, H 3.71, N 7.93
Found C 47.47, H 4.27, N 7.89

EXAMPLES 54–55

By repeating the substantially same procedures as in Example 53, various new aryl esters were prepared. The results are summarized in the following Table 9.

TABLE 9.— 

| Example Number | Aryl | Salt | M.p. (°C.) | Yield (percent) | Elementary analysis (found) | | |
|---|---|---|---|---|---|---|---|
| | | | | | C | H | N |
| 54 | 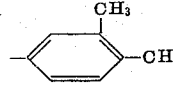 | HBr | 231 (dec.) | 83 | 57.47 | 5.60 | 4.41 |
| 55 | 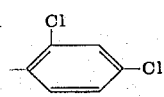 | HBr | 235 (dec.) | 64 | | | |

EXAMPLE 56

3.2 g of 4'-methoxyphenyl 4-benzyloxycarbonyl-aminomethylbenzoate in the form of white crystals with a melting point of 125°~127° C. was prepared by reacting 1.4 g (0.011 mole) of 4-methylphenol with 4-benzyloxycarbonylaminomethylbenzoic acid chloride. Yield 82 percent.

Elementary analysis for $C_{23}H_{21}O_5N$ (M.W. 391.41):
Calcd. C 70.57, H 5.41, N 3.58
Found C 70.82, H 5.49, N 3.41

2.0 g (0.005 mole) of this ester was dissolved in 10 ml of tetrahydrofuran and 20 ml of methanol. To the resulting solution were added 2 ml of 25 percent methanolic hydrochloric acid and 0.5 g of 5 percent palladium on carbon. Then the mixture was treated with hydrogen stream at room temperature under an atmospheric pressure. After the absorption of the theoretical amount of hydrogen, the catalyst was filtered off and the filtrate was evaporated to dryness in vacuo at low temperature. Recrystallization of the white crystals obtained above from ethanol-diethyl ether yielded 1.2 g (82 percent) of 4'-methoxyphenyl 4-aminomethylbenzoate hydrochloride in the form of white needles with a melting point of 263° C. (dec.).

Elementary analysis for $C_{15}H_{16}O_3$ NCl (M.W. 293.74):
Calcd. C 61.32, H 5.49, N 4.76

Found C 61.94, H 5.25, N 4.88

EXAMPLES 57-64

By repeating the substantially same procedures as in Example 56, various new aryl esters were prepared. The results are summarized in the following Table 10.

ml of dried benzene. The mixture was stirred for 30 minutes at room temperature and heated at reflux on a water bath for one hour. After cooling the separated triethylamine hydrochloride was filtered off, and the filtrate was washed with water, dried and evaporated to obtain a white residue. Recrystallization from ethyl TABLE 10.—$NH_2CH_2$-⟨phenyl⟩-COO-Aryl

| Example number | Aryl | Salt | M.p. (° C.) | Yield (percent) | Elementary analysis (found) | | |
|---|---|---|---|---|---|---|---|
| | | | | | C | H | N |
| 57 | $CH_3$-⟨phenyl⟩-$CH_3$ | HCl | 220 (dec.) | 84 | 65.85 | 6.08 | 4.88 |
| 58 | naphthyl | HCl | 244 (dec.) | 64 | 68.76 | 5.29 | 4.48 |
| 59 | -⟨phenyl⟩-C($CH_3$)$_3$ | HCl | 246 (dec.) | 75 | 67.63 | 6.89 | 5.01 |
| 60 | $OCH_3$-⟨phenyl⟩- | HCl | 176-179 | 80 | 60.89 | 5.69 | |
| 61 | Cl-⟨phenyl⟩- | HCl | 212-215 | | 56.61 | 4.51 | |
| 62 | -⟨phenyl⟩-Cl | HCl | 250-252 (dec.) | | 56.92 | 4.35 | |
| 63 | Br-⟨phenyl⟩- | HCl | 228-231 (dec.) | | 49.25 | 3.82 | 4.29 |
| 64 | -⟨phenyl⟩-$CH_3$ | HCl | 230 (dec.) | 60 | 65.60 | 5.98 | 5.24 |

EXAMPLE 65

1.5 g (0.011 mole) of 3-nitrophenol was reacted with 4-N-benzyloxycarbonylaminomethylbenzoic acid chloride to obtain colorless syrup, which was used without purification. The syrup was treated with palladium on carbon in the same manner as in Example 56.

Recrystallization of the crude product from aceton-water yielded 3'-aminophenyl-4-aminomethylbenzoate dihydrochloride in the form of small leaflets with a melting point of 264° C. (dec.).

Elementary analysis for $C_{14}H_{16}O_2N_2Cl_2 \cdot 1/2H_2O$ (M.W. 324.21):
Calcd. C 51.86, H 5.29, N 8.64
Found C 52.17, H 5.53, N 8.67

EXAMPLE 66

4.1 g (0.01 mole) of benzyl N-benzyloxycarbonyl-tyrosinate and 1.2 g of triethylamine were dissolved in 20 ml of dried benzene. To the resulting solution was added 3.0 g (0.01 mole) of 4-N-benzyloxycarbonylamino-methylbenzoic acid chloride dissolved in 20 acetate-isopropyl ether yielded 6.0 g (90 percent) of 4'-(2''-benzyloxycarbonylamino-2''-benzyloxycarbonylethyl)phenyl 4-N-benzyloxycarbonyl-aminomethylbenzoate with a melting point of 150°~153° C.

Elementary analysis for $C_{40}H_{36}O_8N_2$ (M.W. 672.70):
Calcd. C 71.41, H 5.39, N 4.16
Found C 71.83, N 5.32, N 4.14

3.4 g (0.005 mole) of the ester was dissolved in 30 ml of glacial acetic acid. To the resulting solution 0.5 of palladium on carbon was added. The mixture was treated with hydrogen stream at room temperature under an atmospheric pressure. After absorption of the theoretical amount of hydrogen, the catalyst was filtered off. To the filtrate 5 g of 5 percent hydrochloric acid-acetic acid was added. The crude product was precipitated with diethyl ether and petroleum ether, collected and recrystallized from methanol-diethyl ether to obtain 1.2 g (60 percent) of 4'-(2''-carboxy-2''-amino-ethyl)-phenyl 4-aminomethylbenzoate dihydrochloride in the form of needles with a melting point of 276°~279° C. (dec.).

Elementary analysis for $C_{17}H_{20}N_2Cl_2$ (M.W. 387.28):

Calcd. C 52.72, H 5.21, N 7.23, Cl 18.31
Found C 52.80, H 5.24, N 6.64, Cl 17.99

EXAMPLES 67–72

By repeating the substantially same procedures as in Example 66, various new esters were prepared. The results are summarized in the following Table 11.

benzoate with a melting point of 108° C.

The ester was reduced with sodium borohydride to obtain 4'-hydroxymethylphenyl 4-benzyloxycarbonylamino-methylbenzoate with a melting point of 130°~132° C.

Then the above-resulted compound was treated with hydrogen stream in the presence of palladium on car- TABLE 11.—NH$_2$—⟨ ⟩—COO-Aryl

| Example number | Aryl | Salt | M.p. (° C.) | Yield (percent) | Elementary analysis (found) C | H | N | Cl |
|---|---|---|---|---|---|---|---|---|
| 67 | —⟨ ⟩—COOH | HCl | 277–279 (dec.) | 91 | 59.22 | 4.50 | 4.77 | |
| 68 | —⟨ ⟩—CH$_2$COOH | HCl | 260–262 (dec.) | 81 | 59.68 | 5.04 | 4.40 | |
| 69 | —⟨ ⟩—CH$_2$CH$_2$COOH | HCl | 245–247 (dec.) | 83 | 61.00 | 5.39 | 4.22 | |
| 70 | —⟨ ⟩—CH$_2$CH$_2$COOH (ortho) | HCl | 234–236 (dec.) | 79 | 60.39 | 5.16 | 4.52 | 10.52 |
| 71 | —⟨ ⟩—(CH$_2$)$_5$COOH | HCl | 277–279 (dec.) | 85 | 64.76 | 6.29 | 3.82 | |
| 72 | —⟨ ⟩—OCH$_2$CH$_2$COOH | HCl | 240–242 (dec.) | 74.6 | 58.00 | 5.08 | 4.18 | 10.49 |

EXAMPLE 73

3.4 g of 4'-(2"benzyloxycarbonylvinyl)phenyl 4-benzyloxycarbonylaminomethylbenzoate in the form of small needles with a melting point of 145°~147° C. was prepared by reacting 2.5 g (0.01 mole) of benzyl 4-hydroxycinnamate with benzyloxycarbonylaminomethylbenzoic acid chloride. Yield 65 percent.

Elementary analysis for C$_{32}$H$_{27}$O$_6$N (M.W. 521.54):
Calcd. C 73.69, H 5.22, N 2.68
Found C 74.25, H 5.30, N 2.85

2.5 g (0.005 mole) of the thus obtained ester was treated with hydrobromic acid-acetic acid in the same manner as in Example 53 and the resulting product was recrystallized from methanol-diethyl ether to obtain 1.6 g (83 percent) of 4'-(2"-carboxyvinyl)phenyl 4-aminomethylbenzoate hydrobromide in the form of prisms with a melting point of 273° C. (dec.).

Elementary analysis for C$_{17}$H$_{16}$O$_4$NBr·1/2H$_2$O (M.W. 387.23):
Calcd. C 52.73, H 4.43, N 3.62
Found C 52.58, H 4.78, N 3.61

EXAMPLE 74

4- Hydroxybenzaldehyde was reacted with 4-N-benzyloxycarbonylaminomethylbenzoic acid chloride in the same manner as in Example 32 to obtain 4'-formylphenyl 4-N-benzyloxycarbonylaminomethylbon in the same manner as in Example 32 to obtain 4'-hydroxymethylphenyl 4-aminomethylbenzoate hydrochloride in the form of prisms. m.p. >295° C.

Elementary analysis for C$_{15}$H$_{16}$O$_3$NCl (M.W. 293.76):
Calcd. C 61.33, H 5.49, N 4.76
Found C 61.62, H 5.27, N 4.58

EXAMPLE 75

To 4.2 g of 4-aminomethylbenzoic acid chloride hydrochloride, 15 ml of fused phenol was added. The mixture was heated for one hour on a water bath. Then crystals were precipitated by adding diethyl ether and collected from the mixture. Then crude product was washed enough with diethyl ether to remove phenol and recrystallized from methanol-diethyl ether to obtain 4.5 g (86 percent) of phenyl 4-aminomethylbenzoate hydrochloride in the form of white powder with a melting point of 248° C. (dec.).

Elementary analysis for C$_{14}$H$_{14}$O$_2$NCl (M.W. 263.72):
Calcd. C 63.75, H 5.35, N 5.31
Found C 63.99, H 5.44, N 5.39

EXAMPLES 76–80

By repeating the substantially same procedures as in Example 75, various new aryl esters were prepared. The results are summarized in the following Table 12.

TABLE 12.—NH$_2$CH$_2$—⟨ ⟩—COO-Aryl

| Example No. | Aryl | Salt | M.p. (° C.) | Yield (percent) | Elementary analysis (found) C | H | N |
|---|---|---|---|---|---|---|---|
| 76 | —⟨ ⟩—CH$_3$ | HCl | 240 (dec.) | | 64.72 | 5.77 | 5.53 |

TABLE 12.—NH₂CH₂—⟨benzene⟩—COO-Aryl—Continued

| Example No. | Aryl | Salt | M.p. (° C.) | Yield (percent) | Elementary analysis (found) C | H | N |
|---|---|---|---|---|---|---|---|
| 77 | ⟨phenyl⟩—Cl | HCl | 255 (dec.) | 79 | 56.89 | 4.47 | 4.67 |
| 78 | CH₃—⟨phenyl⟩ ·½H₂O | HCl | 203–205 | 78 | 62.99 | 6.12 | 5.10 |
| 79 | CH₃—⟨phenyl⟩—CH₃ | HCl | 220 (dec.) | | 65.88 | 6.08 | 4.92 |
| 80 | OCH₃—⟨phenyl⟩ | HCl | 176–179 | | 61.01 | 5.50 | |

The following examples A to D show the detailed synthetic procedures for the preparation of some starting compounds usable in the present invention, which are new and have not been disclosed.

Example A trans-4-N-benzyloxycarbonyl-AMCHA chloride

To 6.3 g of trans-AMCHA dissolved in 16 ml of 10 percent aqueous sodium hydroxide solution, 8.2 g of benzyloxycarbonyl chloride and 20 ml of 10 percent aqueous sodium hydroxide solution were added over 15 min., with cooling with ice water and vigorous stirring. Stirring was continued for 1 hr. The white crystals precipitated were dissolved by adding water and acidified with hydrochloric acid solution with cooling. The white precipitate as formed was collected, washed with water, dried and recrystallized from benzene-petroleumether to have 10.7 g of trans-4-N-benzyloxy-carbonyl-AMCHA as needles. m.p. 115°~117° C., yield 92 percent.

Elementary analysis for $C_{16}H_{21}O_4N$ (M.W. 291.34):
Calcd. C 65.96, H 7.26, N 4.81
Found C 66.4, H 7.33, N 5.07

The thus obtained trans-4-benzyloxycarbonyl-AMCHA (5.0 g) was mixed with 5 ml of thionyl chloride and warmed to 40° C. for 30 min. Vigorous reaction took place and a homogenous solution was formed. After cooling, 50 ml of dried petroleum ether was added to the solution to precipitate white crystals, which were collected, washed with dried petroleum ether and dried in vacuo to give 4.4 g of trans-4-benzyloxycarbonyl-AMCHA chloride as hygroscopic white crystals melting at 77°~82° C. (Yield 82 percent).

Elementary analysis for $C_{16}H_{20}O_3NCl$ (M.W. 309.79):
Calcd. C 62.03, H 6.51, N 4.52, Cl 11.45
Found C 62.42, H 6.74, N 4.37, Cl 11.23

In the same manner as described above, 4-N-benzyloxycarbonyl-PAMBA chloride melting at 85°~88 C. was obtained from PAMBA. Yield 78.5 percent.

Example B trans-4-N-tertialbutyloxycarbonyl-AMCHA chloride

To 47.1 g (0.3 mol) of trans-AMCHA dissolved in 300 ml of 1 N-sodium hydroxide solution and 150 ml of tetrahydrofurane, was added a syrup newly prepared and containing more than 0.33 mol. of tertialbutylcarbonylchloride (Bulletin of the Chemical Society of Japan, 38, 1522 (1965)) and 150 ml of 2 N-sodium hydroxide solution over 30 min. with cooling with ice water and vigorous stirring. Stirring was continued for 1 hr. below 10° C. and for 30 min. at room temperature and then the mixture was neutralized with 1 N-hydrochloric acid to pH 3 to precipitate white crystals, which were collected and recrystallized from isopropylether to give 45.0 g of trans-4-N-ter.butyloxycarbonyl-AMCHA as white crystalline scales. m.p. 132°~133° C. Yield 58.3 percent.

Elementary analysis for $C_{13}H_{23}O_4N$ (M.W. 257.32):
Calcd. C 59.89, H 8.89, N 5.63
Found C 60.54, H 8.80, N 5.63

The thus obtained trans-4-N-tertbutyloxylcarbonyl-AMCHA (2.3 g) and triethylamine (3.2 g) were dissolved in 40 ml of dried benzene, and to the solution, purified thionyl chloride (2.4 g) was gradually added to have an exothermic reaction with precipitation. The reaction mixture was warmed at 50° C. for 10 min. and then cooled. The precipitate was filtered off, and the filtrate and the washings were combined and concentrated to dryness under reduced pressure to give trans-4-N-tertbutyloxy-carbonyl-AMCHA chloride as a syrup.

Example C trans-AMCHA chloride 5.0 g of trans-AMCHA was dissolved in 20 ml of thionyl chloride. Gradually, crystals were precipitated. After 30 min., ether was added to the reaction mixture and the crystals were collected and dried in vacuo to give 5.4 g of trans-AMCHA chloride hydrochloride as highly hygroscopic white needles.

Example D 4-Hydroxyaryl derivatives

To a solution of 3.0 g of 4-hydroxyphenylacetic acid in 20 ml of 4 percent aqueous sodium hydroxide and 30 ml of ethanol, 3.0 g of benzylchloride was added and the resulting mixture was heated at reflux on an oil bath at 120° C. for 1.5 hrs. After completion of the reaction, ethanol was removed to give a syrup which changed to solid on cooling. The resulting solid was treated with 20 ml of ether. The separate water layer was removed, and the ether layer was washed with 5 percent aqueous sodium carbonate solution, dried and evaporated. The resulting white residue was recrystallized from petroleumether to give 2.3 g of benzyl 4-hydroxyphenylacetate as white prisms melting at 88°~92° C. (Yield 46.5 percent).

Elementary analysis for $C_{15}H_{14}O_3$ (M.W. 242.26):
Calcd. C 74.36, H 5.83
Found C 74.51, H 5.94

In the same manner as above, the following new 4-hydroxyaryl derivatives were synthesized.

| p-Hydroxyaryl derivatives | M.p. (° C.) (B.p.) | Elementary analyses (found; percent) | | | Yield (percent) |
|---|---|---|---|---|---|
| | | C | H | N | |
| p-HO—($C_6H_4$)—CH=CHCOOBz | 89–91 | 75.8 | 5.6 | | 37 |
| p-HO—($C_6H_4$)—$CH_2$—$CH_2$COOBz | 199/1 mm. Hg | 75.1 | 6.3 | | 35 |
| p-HO—($C_6H_4$)—CO($CH_2$)$_4$—COOBz | 90–96 | 73.0 | 6.7 | | 32 |
| p-HO—($C_6H_4$)—($CH_2$)$_5$—COOBz | (213.5/1 mm. Hg) 40–41 | 76.4 | 7.3 | | 37 |
| p-HO—($C_6H_4$)—$CH_2$·CH(NHCbz)COOBz | 116–118 | 70.3 | 5.7 | 3.5 | 30 |
| p-HO—($C_6H_4$)—O($CH_2$)$_2$COOBz | (200–201/1 mm. Hg) 74–79 | 70.4 | 6.1 | | 25.5 |
| m-HO—($C_6H_4$)—$CH_2$—$CH_2$COOBz | (194–196/1 mm. Hg) | 75.2 | 6.3 | | 28.5 |
| 2,4-dibenzyloxycarbonyl phenol | 91–83 | 73.2 | 5.1 | | 29 |
| 3-benzyloxycarbonyl-β-naphtol | 86–87 | 76.1 | 5.3 | | 37 |
| 6-benzyloxycarbonyl-3-pyridinolhydrochloride | 142–145 (dec.) | 58.4 | 4.6 | 5.6 | 16 |

Bz: Benzyl radical
Cbz: Benzyloxycarbonyl radical

What we claim is:

1. A compound of the general formula

wherein "Aryl" is a phenyl, which may have one to three substituents selected from hydroxy, halogen, nitro, amino, carboxyl, formyl, sulfamoyl, carboxyalkylamino, $C_1$ to $C_6$-alkyl, $C_1$ to $C_6$-alkyl, $C_1$ to $C_6$-alkoxy, $C_1$ to $C_6$-alkenyl, phenyl, carboxyalkoxy, carboxyalkenyl, carboxyalkylcarbonyl, hydroxyalkyl, alkoxycarbonyl and carboxyalkyl the alkyl portion of which may be substituted with amino, hydroxy or halogen, and the pharmaceutically acceptable salts thereof.

2. 4'-carboxyphenyl trans-4-aminomethylcyclohexane-1-carboxylate and the pharmaceutically acceptable salts thereof.

3. 4'-carboxymethylphenyl trans-4-aminomethyl-cyclohexane-1-carboxylate and the pharmaceutically acceptable salts thereof.

4. 4'-(2''-carboxyethyl)phenyl trans-4-aminomethyl-cyclohexane-1-carboxylate and the pharmaceutically acceptable salts thereof.

5. 4'-(2''-carboxyvinyl)phenyl trans-4-aminomethyl-cyclohexane-1-carboxylate and the pharmaceutically acceptable salts thereof.

6. 4'-(2''-carboxyethoxy)phenyl trans-4-aminomethyl-cyclohexane-1carboxylate and the pharmaceutically acceptable salts thereof.

7. 4'-(5''-carboxy-n-pentyl)phenyl trans-4-aminomethyl-cyclohexane-1-carboxylate and the pharmaceutically acceptable salts thereof.

8. 4'-(1''-hydroxy-5''-carboxy-n-pentyl)phenyl trans-4-aminomethylcyclohexane-1-carboxylate and the pharmaceutically acceptable salts thereof.

9. 4'-(1'''-oxo-5''-carboxy-n-pentyl)phenyl trans-4-aminomethylcyclohexane-1-carboxylate and the pharmaceutically acceptable salts thereof.

10. 4'-(2''-amino-2''-carboxyethyl)phenyl trans-4-aminomethylcyclohexane-1-carboxylate and the pharmaceutically acceptable salts thereof.

* * * * *